United States Patent
Wang et al.

(10) Patent No.: US 10,807,064 B2
(45) Date of Patent: Oct. 20, 2020

(54) REACTOR FOR MULTI-PHASE COMPOSITION

(71) Applicant: ExxonMobil Chemical Patents Inc., Baytown, TX (US)

(72) Inventors: Yu F. Wang, Houston, TX (US); Richard D. Hembree, Houston, TX (US); Michael F. McDonald, Jr., Kingwood, TX (US); Joseph A. Maier, Port Naches, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 199 days.

(21) Appl. No.: 15/513,865

(22) PCT Filed: Sep. 14, 2015

(86) PCT No.: PCT/US2015/049975
§ 371 (c)(1),
(2) Date: Mar. 23, 2017

(87) PCT Pub. No.: WO2016/069121
PCT Pub. Date: May 6, 2016

(65) Prior Publication Data
US 2017/0296998 A1    Oct. 19, 2017

Related U.S. Application Data

(60) Provisional application No. 62/073,697, filed on Oct. 31, 2014.

(51) Int. Cl.
*B01J 19/20*    (2006.01)
*B01F 7/04*    (2006.01)
(Continued)

(52) U.S. Cl.
CPC ............ *B01J 19/20* (2013.01); *B01F 7/048* (2013.01); *B01J 8/10* (2013.01); *B01J 19/1812* (2013.01);
(Continued)

(58) Field of Classification Search
CPC ....................................... B01J 19/20
(Continued)

(56) References Cited

U.S. PATENT DOCUMENTS

| 216,958 | A | * | 7/1879 | Hudson | ................. | B02C 13/205 |
| | | | | | | 44/631 |
| 1,101,142 | A | * | 6/1914 | Mueller | ................ | B29C 48/505 |
| | | | | | | 366/81 |

(Continued)

FOREIGN PATENT DOCUMENTS

| DE | 19535817 | 4/1996 |
| GB | 1321709 | 6/1973 |

(Continued)

*Primary Examiner* — David L Sorkin
(74) *Attorney, Agent, or Firm* — Derek M. Kato (57) ABSTRACT

A reactor comprising a first portion having a generally cylindrical housing, an inlet at one end of said first portion housing, the opposed end of said first portion housing being the outlet of said first portion, where said first portion includes a rotatable shaft positioned axially within said housing and including at least two shearing paddles extending radially from said rotatable shaft and a second portion having a generally frustoconical housing having a first end larger than a second end, said first end constituting an inlet to said second portion and coextensive with said opposed end of said first portion housing, and an outlet at said second end, where said second portion includes a rotatable shaft positioned axially within said housing and including at least one generally helical flight extending radially from said rotatable shaft.

9 Claims, 4 Drawing Sheets

(51) Int. Cl.
*C08F 6/00* (2006.01)
*B01J 8/10* (2006.01)
*B01J 19/18* (2006.01)

(52) U.S. Cl.
CPC ....... *C08F 6/001* (2013.01); *B01J 2208/0084* (2013.01); *B01J 2208/00867* (2013.01); *B01J 2219/00779* (2013.01); *B01J 2219/182* (2013.01); *B01J 2219/1943* (2013.01); *B01J 2219/1946* (2013.01)

(58) Field of Classification Search
USPC ..... 366/81, 89, 196, 303, 307, 319, 323, 75; 422/137

See application file for complete search history.

(56) References Cited

U.S. PATENT DOCUMENTS

| | | | | |
|---|---|---|---|---|
| 1,815,809 | A | * | 7/1931 | Steele ........................ B28B 3/22 366/81 |
| 2,213,381 | A | * | 9/1940 | Brown .................. B28C 5/1223 366/80 |
| 8,519,093 | B2 | | 8/2013 | Diener et al. |
| 8,524,859 | B2 | | 9/2013 | Wang et al. |
| 2004/0076073 | A1 | | 4/2004 | Yao et al. |
| 2010/0152396 | A1 | | 6/2010 | Fleury et al. |
| 2012/0285722 | A1 | * | 11/2012 | Nilsson .................. C08F 10/00 174/110 SR |
| 2013/0203942 | A1 | | 8/2013 | Paul et al. |

FOREIGN PATENT DOCUMENTS

| | | |
|---|---|---|
| JP | H02-95426 A | 4/1990 |
| JP | 2002-204970 A | 7/2002 |
| JP | 2009-247969 A | 10/2009 |
| WO | 2011/136884 | 11/2011 |

* cited by examiner

REACTOR FOR MULTI-PHASE COMPOSITION

PRIORITY CLAIM TO RELATED APPLICATIONS

This present application is a National Stage Application of International Application No. PCT/US2015/049975 filed Sep. 14, 2015, which claims the benefit of and priority to U.S. Provisional Application Ser. No. 62/073,697 filed Oct. 31, 2014, the disclosures of which are fully incorporated herein by their reference.

FIELD OF THE INVENTION

This disclosure relates to a reactor that is useful for multi-phase compositions. In particular embodiments, the reactor includes a reaction zone, a separation zone, and a compaction zone.

BACKGROUND OF THE INVENTION

In certain polymerization processes, liquid or gaseous monomer is polymerized in the presence of a diluent in which the polymerization product is not appreciably soluble. As a result, a slurry is formed in which the solid polymerization product is dispersed in the form of polymer particles or agglomerates. In many of these processes, the diluent facilitates heat transfer away from the polymer agglomerates.

While these processes are technologically useful, these polymerization processes present several challenges. To begin with, the resultant slurry may have a relatively high viscosity, which inhibits mixing and heat transfer, and which can negatively impact polymer properties, reactor operability, and may cause reactor fouling. This relatively high viscosity also places practical limitations on the solids content of the polymer being produced. Also, since the reaction takes place in the presence of a diluent, there is a need to separate the polymer and polymer agglomerates from the diluent and, ultimately, deliquify and dry the polymer product.

As the skilled person appreciates, polymerizations of this nature are typically conducted within continuously-stirred tank reactors using adequate volumes of diluent and mixing to maintain fluid conditions. Following polymerization, the diluent, which is often an organic solvent, is removed by conventional solvent stripping techniques. For example, the solvent may be stripped from the polymerization product by using steam desolventization techniques, which produces a wet product that must be dried.

These conventional processes, as well as the equipment used in these processes, can be energy intensive and costly. There is, therefore, a need for an apparatus in which slurry polymerizations can be efficiently conducted.

SUMMARY OF THE INVENTION

Described herein is an apparatus that can be used as a reactor for multi-phase compositions. This apparatus, which may also be referred to as a reactor, includes at least a reaction zone wherein reactants, products, and optional diluents are mixed, back mixed, and/or kneaded or granulated, and a separation zone wherein physically-distinct constituents of the reaction mixture can be separated, and optionally, a compaction zone where the reaction product can undergo compaction forces.

Disclosed is directed toward a reactor comprising a first portion having a generally cylindrical housing, an inlet at one end of said first portion housing, the opposed end of said first portion housing being the outlet of said first portion, where said first portion includes a rotatable shaft positioned axially within said housing and including at least two shearing paddles extending radially from said rotatable shaft and a second portion having a generally frustoconical housing having a first end larger than a second end, said first end constituting an inlet to said second portion and coextensive with said opposed end of said first portion housing, and an outlet at said second end, where said second portion includes a rotatable shaft positioned axially within said housing and including at least one generally helical flight extending radially from said rotatable shaft.

Also disclosed is a reactor comprising a first portion including a generally cylindrical housing and a rotatable shaft positioned axially within said housing and including at least two shearing paddles extending radially from said rotatable shaft, said housing including at least two kneading hooks fixed to said housing and extending inwardly toward said rotatable shaft, said first portion having a length defined by a first terminus, which is proximate to an inlet, and an outlet terminus, said housing of said first portion having an inner wall, where an open space exists between said inner wall, said shaft, said at least two flights, and said kneading hooks and a second portion including a housing and a rotatable shaft positioned axially within said housing and including at least one generally helical flight extending radially from said rotatable shaft, said housing of said second portion having an inner wall and an open space between said inner wall and said rotatable shaft and said at least one generally helical flight, said open space defined by a cross-sectional area taken in the plane transverse to axis of said portion, said second portion having a length defined by an inlet terminus and an outlet terminus, where the cross-sectional area of said open space decreases from said inlet terminus to said outlet terminus; where the open space at the inlet terminus of said second portion is coextensive with said open space at the outlet terminus of said first portion.

Also disclosed is a reactor comprising a first portion adapted to mix and knead the contents of the reactor, a second portion adapted to separate the physically-distinct constituents therein, and a third portion adapted to compact the contents therein to squeeze the material contents.

Disclosed is a polymerization process comprising the steps of charging monomer and diluent to reactor having three distinct zones that are coextensive at their interfaces, polymerizing the monomer to form polymer product with a first zone of the reactor while subjecting the monomer, polymer product, and diluent to kneading, separating the polymer product from at least a portion of the diluent within a second zone of the reactor, compacting the polymer product with a third zone of the reactor, and discharging the polymer product from the reactor.

These and other features, aspects, and advantages will become better understood with regard to the following description and appended claims.

DETAILED DESCRIPTION OF ILLUSTRATIVE EMBODIMENTS

Various specific embodiments, versions, and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Figure 1:
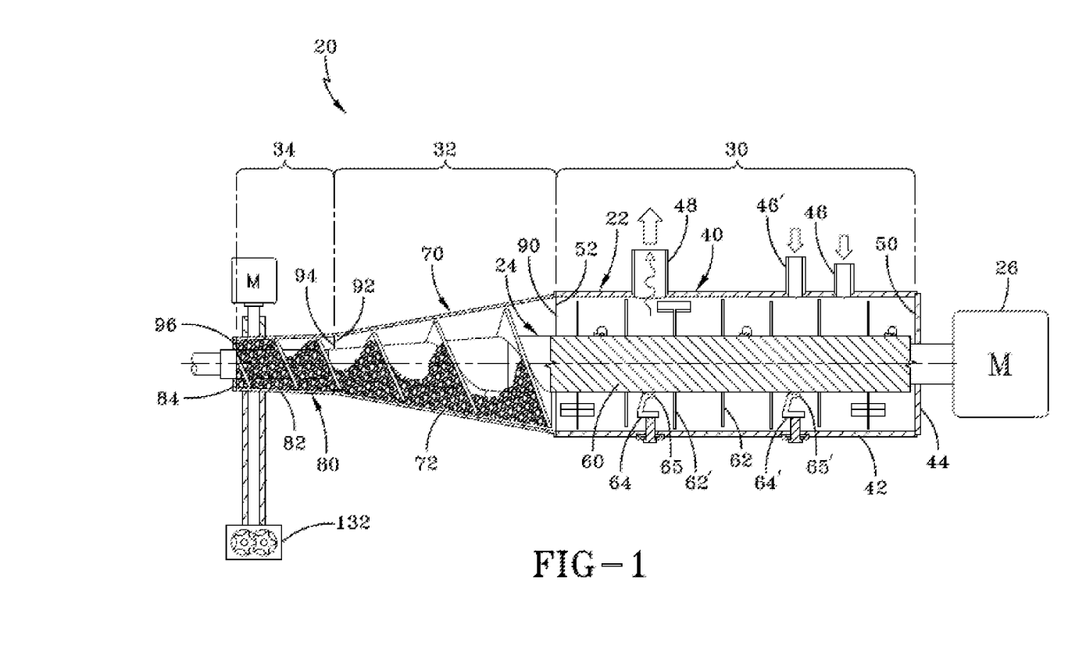
FIG. 1 is a cross-sectional schematic representation of a reactor according to embodiments of the invention.

Embodiments of the present invention can be described with reference to FIG. 1, which shows reactor 20, which may also be referred to as polymerization reactor 20. Reactor 20 generally includes housing 22 and a shaft assembly 24 positioned axially within housing 22. In one or more embodiments, shaft assembly 24 is rotatable and may be suitably supported for rotation by the use of bearings, which are not shown. Shaft assembly 24 (which may also be referred to as shaft 24) may be mechanically attached to a suitable drive source 26 for rotating shaft 24 at a desired speed. In one or more embodiments, shaft 24 is mechanically attached to a single drive source as shown in FIG. 1, and in other embodiments, shaft 24 is mechanically attached to two distinct drive sources at opposing ends of shaft 24.

The subcomponents of reactor 20 may be further described with reference to operationally distinct portions of reactor 20. Specifically, reactor 20 may be defined with references to first portion 30, which may also be referred to as reaction zone 30, second portion 32, which may also be referred to as separation zone 32, and third portion 34, which may also be referred to as compaction zone 34.

While each portion of the reactor is adapted to convey the contents of the reactor with a positive overall net flow forward, each portion is uniquely adapted to impart intended forces on the contents therein to thereby accomplish distinct goals. For example, first portion 30 is adapted to mix, back mix, and/or knead the contents of the reactor and thereby create relatively high surface contact between the contents of the reactor and the mixing elements within the reactor. Second portion 32, on the other hand, is adapted to separate physically-distinct constituents within the contents of the reactor (e.g., separate liquids and solids) and allow one of the constituents to migrate or flow (as in the case of a liquid) back to first portion 30. Third portion 34 is adapted to squeeze the contents of the reactor (e.g., reaction products), which action fills any voids within third portion 34 with the material contents and also complements the separation process taking place in second portion 32.

In one or more embodiments, first portion 30 of reactor 20 includes a first portion housing 40, which includes side wall 42 and end wall 44. Side wall 42 and/or end wall 44 may include one or more openings. For example, as shown in FIG. 1, inlets 46, 46' are provided in side wall 42 radial to shaft assembly 24. Side wall 42 and/or end wall 44 may include one or more outlets. For example, and as shown in FIG. 1, outlet 48 is provided within side wall 42 radial to shaft assembly 24. In particular embodiments, outlet 48 is adapted to allow removal of a vapor stream from the reactor, which can thereby provide for the evaporative cooling of the materials within the reactor. As will be appreciated by the skilled person, the location of the inlets and outlets can be varied based upon preference. For example, it may be desirable to include an inlet or outlet (not shown) within end wall 44.

In one or more embodiments, side wall 42 is generally cylindrical and therefore the cross-section area (i.e., the area transverse to shaft 24) is constant or substantially constant through the axial length of first portion 30. The axial length of first portion 30 extends from a first end 50, which is proximate to end wall 44, to a second end 52, which is longitudinally opposed to first end 50.

As suggested above, first portion 30 is adapted to mix and knead the contents thereof. Several designs can accomplish these goals. Kneading provides both large surface contact with the kneading elements and surface renewal of the materials within the reactor (e.g., agglomerates that may form are mechanically broken or chopped to expose the inner surface of the agglomerates). The skilled person understands that this can be accomplished through low-shear mixing in combination with sufficient mixing volume. Also, first portion 30 is adapted to convey the materials within the reactor. This can be accomplished through, for example, a plurality of mixing elements that are helically wrapped around the core and thereby provide a conveying force to materials within reaction zone 30. In one or more embodiments, these elements can also provide the desired shearing surface area for the desired amount of shear energy to be inputted to the materials within reaction zone 30.

Figures 3, 3A:
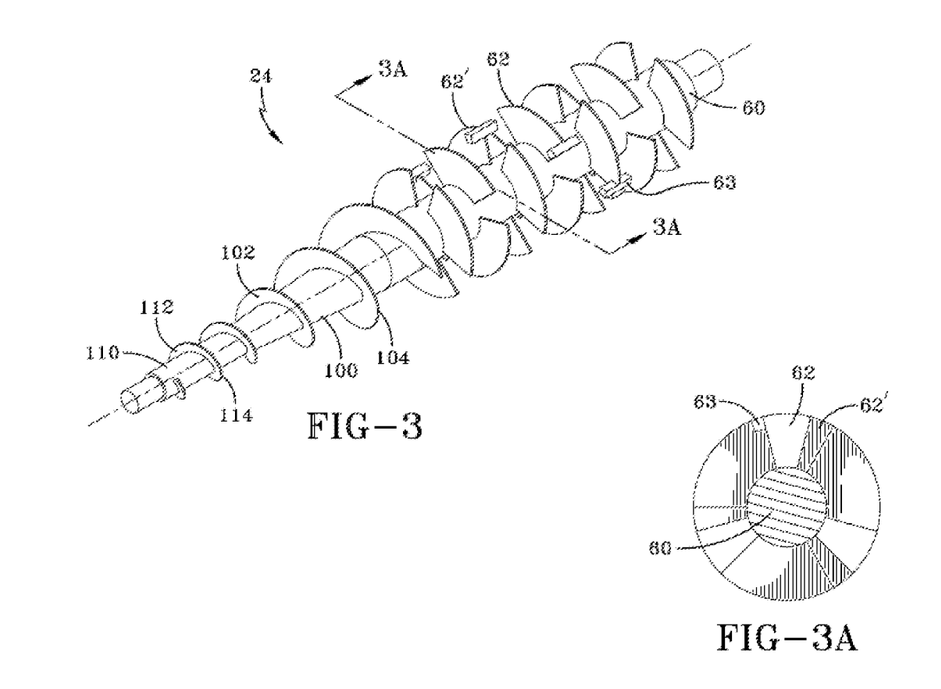
FIG. 3 is a perspective view of a shaft assembly of a reactor according to embodiments of the invention.
FIG. 3A is a cross-sectional view of the shaft assembly shown in FIG. 3 taken along 3A.

In particular embodiments, the desired mixing and kneading within first portion 30 is accomplished through a hook and paddle kneading arrangement. For example, first portion 30 may include two or more kneading paddles. As best shown in FIG. 3, shaft assembly 24 may include axial portion 60 and one or more flights of paddles 62, 62' extending radially from axial portion 60. In one or more embodiments, shaft assembly 24 may include 3 to 10 flights of paddles within first portion 30, or in other embodiments 4 to 8 flights within first portion 30. A "flight" of paddles is defined as a grouping or series of paddles along a common line or angle relative to the shaft assembly 30 extending longitudinally down axial portion 60. The number of flights is dependent on a variety of factors including the diameter of the side wall, the diameter of the axial portion, and the width of each paddle. In one or more embodiments, each flight of paddles may contain at least 1 and up to 100 paddles, or each flight may contain 1 to 20 paddles, or each flight may contain 2 to 10 paddles, or each flight may contain 2 to 8 paddles. The number of paddles may be dependent on a variety of factors including the axial length of the first portion, the diameter of the axial portion, the diameter of the side wall, and the amount of shear energy desired to be generated in the first portion. Reference may also be made to a radial grouping of paddles, which refers to those paddles sharing a common position along the length of axial portion 60. In other words, a radial grouping of paddles shares a common plane that is transverse to the axis of axial portion 60. In one or more embodiments, the number of paddles within a radial grouping is equal to the number of flights.

In one or more embodiments, each flight of paddles may extend at an angle along the longitudinal length of axial portion 60. Depending on the length of axial portion 60 (or the length of first portion 30), this angular arrangement may cause the flight of paddles to generate a helical pattern about axial portion 60. For example, where the length of first portion 30 is sufficiently long, each flight might fully wrap itself at least once about axial portion 60. Due to the angle, when the kneader is viewed from each end, a portion of each successive paddle in each flight is visible, as generally shown in FIG. 3A.

Figures 2, 2A:
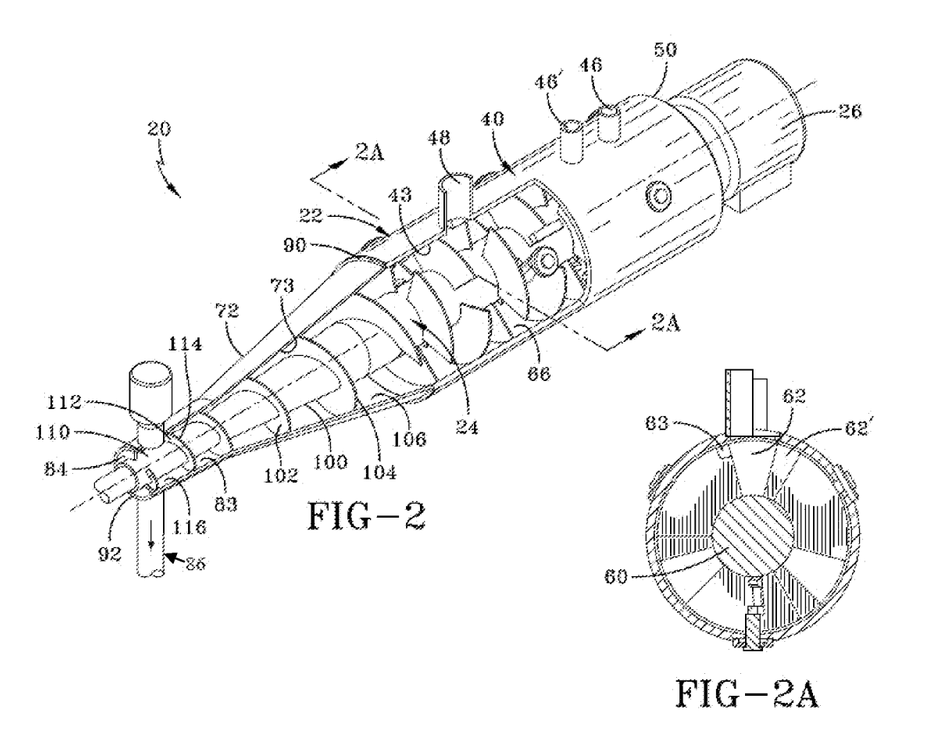
FIG. 2 is a perspective view of a reactor according to embodiments of the invention.
FIG. 2A is a cross-sectional view of the reactor shown in FIG. 2 taken along 2A.

In one or more embodiments, each paddle 62, 62' has a truncated triangular shape as best shown in FIGS. 2A and 3A. The width of each paddle 62, 62' can be measured transverse to the axis of axial portion 60. As shown in FIGS. 2A and 3A, the width of each paddle 62, 62' increase as the paddles extend radially away from axial portion 60. One or more of paddles 62, 62' may carry a clearing bar 63. As shown in FIGS. 2 and 3, clearing bar 63 may be substantially thinner than the width of each paddle 62, 62', or in other embodiments, the width of bar 63 may extend over a larger portion of paddles 62, 62' (i.e., extend over a greater portion of the radial arc of the paddle). Also, as best shown in FIG. 3, bar 63 extends perpendicularly from the radial axis of paddle 62, 62' and is oriented parallel to axial portion 60. In alternative embodiments, which are not shown, bar 63 may be positioned at an angle with respect to axial portion 60, which will provide a conveying affect to materials within first portion 30. For example, bar 63 may be offset at an angle of 0° to 30° relative to axial portion 60.

Paddles 62, 62' are configured and arranged to operate in conjunction with at least two hooks 64, 64' that are fixed to side wall 42 of first portion 30. In one or more embodiments, as shaft assembly 24 rotates, paddles 62, 62' pass adjacent to hooks 64, 64'. Hooks 64, 64' are also arranged in flights along the axial length of first portion 30. The number of flights of hooks may depend on a variety of factors including the number of paddles 62, 62' in each flight of paddles. Hooks 64, 64' may also be described with reference to radial groupings of hooks, which refers to the number of hooks that share a common location along the length of first portion 30 (which corresponds to the length of axial portion 60). In one or more embodiments, first portion 30 may include at least one hook per radial grouping. The number of hooks within a radial grouping may depend on a number of factors including the axial length of the first portion, the diameter of the axial portion, the diameter of the side wall, and the amount of shear energy desired to be generated in the first portion. The number of radial groupings may likewise depend on a number of factors. In one or more embodiments, first portion 30 includes one radial grouping of hooks (or simply one hook) per radial grouping of paddles.

In one or more embodiments, each hook 64, 64' has a radially inner terminal end 65, 65' that does not contact axial portion 60 of shaft assembly 24. Hooks 64, 64' are configured to obtain a desired surface area for shearing of reactant and product within first portion 30 to thereby obtain desired surface area for shearing and provide a combination of vertical and horizontal shearing surfaces.

As best shown in FIG. 2, a space 66, which may also be referred to as channel 66, exists between shaft assembly 24 within first portion 30 (i.e., axial portion 60 and paddles 62, 62'), and the inner diameter 43 of side wall 42, as well as hooks 64, 64'.

Turning now to second portion 32, reference is again made to FIG. 1, which shows second portion housing 70, including side wall 72. Side wall 72 may include one or more outlet openings (not shown) that allow removal of material, such as liquids or gasses, from second portion 32 in a direction radial to shaft assembly 24. For example, the lower portion of second portion 32 may include a drain opening that can allow liquids or less viscous materials to flow out of the reactor. Likewise, second portion 32 can be equipped with an opening that is adapted to allow removal of vapor from the reactor, which can provide a mechanism for the evaporative cooling of the materials within the reactor. Likewise, side wall 72 may include one or more inlet openings (not shown) that allow materials to be charged to second portion 32 at a direction radial to shaft assembly 24. In one or more embodiments, second portion 32 has an axial length that extends from a first end 90, which is adjacent to first portion 30, to second end 92, which is adjacent to third portion 34 and longitudinally opposed to first end 90.

As best shown in FIGS. 2 and 3, shaft assembly 24 within second portion 32 includes axial portion 100 having helical flight(s) 102 extending therefrom. As best shown in FIG. 2, a space 106, which may also be referred to as channel 106, exists between shaft assembly 24 within second portion 32 (i.e., axial portion 100 and helical flight 102), and the inner diameter 73 of side wall 72. The depth of channel 106 (which may also be referred to as channel depth) is the distance between axial portion 100 and the inner diameter 73 of side wall 72. The channel depth is commensurate with the height of helical flight 102 at any given point along the axial length of axial portion 100. The height of helical flight 102 at any given point is the distance from axial portion 100 to the tip 104 of helical flight 102.

As suggested above, second portion 32 is adapted to separate physically-distinct constituents within the contents of the reactor and allow one of the constituents to migrate or flow back to first portion 30. As the skilled person recognizes, physically-distinct constituents, within the context of this invention, refers to those materials that can be separated by the combination of gravity and the conveying action taking place within second portion 32. For example, solids can be separated from liquids within second portion 32. Likewise, viscous liquids can be separated from less viscous liquids within second portion 32.

In any embodiment, the separation of physically-distinct materials can be accomplished, at least in part, through a gap that may be present between the tip 104 of helical flight 102 and inner diameter 73 of side wall 72. The size of this gap may be constant throughout the length of second portion 32 or it may vary. In these or other embodiments, helical flight 102 can be adapted to permit the flow of liquid back to first portion 30. For example, helical flight 102 may include drainage holes (not shown), which are openings in flight 102 at or near tip 104 and/or at or near axial portion 100. In any embodiments, helical flight 102 may be in the form of a helical ribbon (not shown) spaced apart from axial portion 100 at one or more locations along the length of shaft 24 within second portion 32. Also, helical flight 102 may be slotted to allow the flow of liquids from second portion 32 to first portion 30 (not shown). Alternatively, the movement of fluid may be facilitated by modifications made to housing 72, for example, housing 72 may include rifling (not shown) within inner wall 73, or breaker bolts, not shown, may extend from housing 72 into the reactor and sync with slots within the flights (not shown).

With reference again to FIGS. 2 and 3, channel 106 may be defined by its cross-sectional area (transverse to the axial length of shaft assembly 24) at any point along the length of shaft assembly 24 within second portion 32. In one or more embodiments, the cross-sectional area of channel 106 at first end 90 is greater than the cross-sectional area of channel 106 at second end 92. In one or more embodiments, cross-sectional area of channel 106 continuously decreases from first end 90 to second end 92. The rate of decrease from first end 90 to second end 92 may be constant or variable. As the skilled person will appreciate, this decrease in the cross-sectional area of channel 106, together with forces of gravity, will promote the back flow of liquids from second portion 32 to first portion 30.

In one or more embodiments, and as shown in FIG. 1, the reduction in the cross-sectional area of channel 106 from first end 90 to second end 92 may be accomplished by employing a frustoconical side wall 72. Within these or other embodiments, axial portion 100 of shaft assembly 24 may have a generally constant diameter from first end 90 to second end 92. Optionally, in combination with frustoconical side wall 72, axial portion 100 of shaft assembly 24 may vary from first end 90 to second end 92.

As best shown in FIG. 2, in particular embodiments, the height of helical flight 102 at any given point along the axial length thereof is generally commensurate with the cross-sectional area of frustoconical side wall 72. Accordingly, the height of helical flight 102 decreases along the axial length of shaft assembly 24 from first end 90 to second end 92 of second portion 32. In one or more embodiments, any gap that exists between tip 104 of helical flight 102 and the inner diameter 73 of side wall 72 is substantially constant across the axial length from first end 90 to second end 92. As with the cross-sectional area of channel 106, the rate of decrease in the height of helical flight 102 may be constant or variable. Or, as suggested above, the size of the gap may be variable by, for example, altering the height of flight 102 relative to inner diameter 73.

In any embodiment, the backflow of liquids from second portion 32 to first portion 30 may be aided by positioning of the overall reactor. For example, the desired goal of separation and return of liquids to first portion 30 from second portion 32 can be accomplished by operating the entire reactor, or at least a portion thereof, at an incline such that second end 92 of second portion 32 is situated higher than first end 90 of second portion 30. For example, reactor 20 can be positioned at an angle of up to about 20 degrees.

As shown in FIG. 1, the cross-sectional area at first end 90 of second portion 32 is equal to the cross-sectional area at second end 52 of first portion 30. Stated another way, inner diameter 43 of housing 40 at end 52 is equal to inner diameter 73 of housing 70 at end 90. As a result of this configuration, channel 66 and channel 106 are coextensive at the interface between first portion 30 and second portion 32 thereby allowing material to be transferred from first portion 30 to second portion 32 without interference beyond that offered by the external walls of the reactor and the mixing elements within the reactor.

Turning now to third portion 34, reference can be made to FIGS. 1 and 2, which show third portion housing 80 including side wall 82 and end wall 84. Side wall 82 includes one or more outlet openings 86 that allow removal of material from the reactor 20 in a radial direction to shaft assembly 24. In any or alternative embodiments, materials may be removed axially at or near end wall 84. Whether axially or radially positioned, outlet opening 86 may be complemented with a positive discharge isolation device to prevent backflow of materials into the reactor. The skilled person can use a number of devices as a positive discharge isolation device such as, but not limited to, a full-port-ball valve or a V-ball valve, as well as a variable or fixed die in conjunction with a shut off valve or a discharge extruder.

Also, side wall 82 may include one or more outlet openings (not shown) that allow removal of material, such as liquids or gasses, from third portion 34 in a direction radial to shaft assembly 24. Likewise, side wall 82 may include one or more inlet openings (not shown) that allow materials to be charged into third portion 34 at a direction radial to shaft assembly 24. Third portion 34 has an axial length that extends from a first end 94, which is adjacent to second portion 32, to second end 96, which is adjacent to end wall 84 and longitudinally opposed to first end 94.

As best shown in FIGS. 2 and 3, shaft assembly 24 extends through third portion 34 and may, in a similar fashion to second portion 32, include axial portion 110 having helical flight(s) 112 extending therefrom to thereby define a space 116, which may be referred to as channel 116, that exists between shaft assembly 24 and the inner diameter 83 of side wall 82 within third portion 34. The depth of channel 116 (which may also be referred to as channel depth) is the distance between axial portion 110 and the inner diameter 83 of side wall 82. The channel depth may be commensurate with the height of helical flight 112 at any given point along the axial length of axial portion 110. The height of helical flight 112 at any given point is the distance from axial portion 110 to the tip 114 of helical flight 112.

As with second section 32, channel 116 within third portion 34 may be defined by its cross-sectional area (transverse to the axial length of shaft assembly 24) at any point along the length of shaft assembly 24 within second portion 34. In certain embodiments, cross-sectional area of channel 116 within third portion 34 decreases from first end 94 to second end 96. In other embodiments, cross-sectional area of channel 116 within third portion 34 is constant or substantially constant from first end 94 to second end 96.

As suggested above, third portion 34 is adapted to compact the materials within this section (i.e., the section is adapted to create pressure); the compaction may be equated with squeezing of the materials to remove or release liquids or gases from the materials. This may be accomplished in several ways. For example, in one or more embodiments, the average cross-sectional area of channel 116 within third portion 34 is smaller than the average cross-sectional area of channel 106 within second portion 32. Compaction may also be accomplished through the relative spacing of flights 112 within third portion 34. For example, the spacing between flights 112 within third portion 34 may be smaller than the spacing of flights 102 within second portion 32.

In one or more embodiments, as may be best shown in FIG. 1, the cross-sectional area at first end 94 of third portion 34 is equal to the cross-sectional area at second end 92 of second portion 32. Stated another way, inner diameter 73 of housing 70 at end 92 is equal to inner diameter 83 of housing 80 at first end 94. As a result of this configuration, channel 106 within second portion 32 and channel 116 within third portion 34 are coextensive at the interface between second portion 32 and third portion 34 thereby allowing material to be transferred from second portion 32 to third portion 34 without interference beyond that offered by the external walls of the reactor and the mixing elements within the reactor.

As set forth above, shaft assembly 24 may include first axial portion 60, which may simply be referred to as axial portion 60, second axial portion 100, which may simply be referred to as axial portion 100, and third axial portion 110, which may simply be referred to as axial portion 110, respectively. In one or more embodiments, first axial portion 60 and second axial portion 100 are integral with one another. For example, first axial portion 60 and second axial portion 100 are affixed to one another and therefore integrally rotate. This embodiment may include a construction wherein first axial portion 60 and second axial portion 100 include an integrally machined solid material. In other embodiments, first axial portion 60 and second axial portion 100 may include separate elements suitably connected to one another at, for example, the interface between first portion 30 and second portion 32. This connection may include a fixed, immovable connection whereby first axial portion 60 and second axial portion 100 rotate together.

In one or more embodiments, second axial portion 100 and third axial portion 110 are integral with one another. For example, second axial portion 100 and third axial portion 110 are affixed to one another and therefore integrally rotate. This embodiment may include a construction wherein second axial portion 100 and third axial portion 110 include an integrally machined solid material. In other embodiments, second axial portion 100 and third axial portion 110 may include separate elements suitably connected to one another at, for example, the interface between first portion 30 and second portion 32. This connection may include a fixed, immovable connection whereby second axial portion 100 and third axial portion 110 rotate together.

In other embodiments, the connections between first axial portion 60 and second axial portion 100, and/or between second axial portion 100 and third axial portion 110 may include a rotatable connection whereby, for example, first axial portion 60 and second axial portion 100 can separately rotate. In this latter embodiment (not shown), first axial portion 60 may, for example, be mechanically connected to a first drive source, and second axial portion 100 (and/or third axial portion 110) may be mechanically attached to a second drive source, which will provide the ability to rotate first axial portion 60 and second axial portion 100 (and/or third axial portion 110) at different speeds.

In yet other embodiments (not shown), shaft 24 may include a central core extending from first end 50 to second end 96 of reactor 20, and the central core may carry one or more outer sleeves, which outer sleeves may carry paddle flight 62, 62' within first portion 30 or helical flights 102, 112 within second and third portions 32, 34. As a result of this configuration, paddle flights 62, 62' can rotate independently of helical flights 102, 112 by virtue of the sleeve. In these or other embodiments, the central core can carry paddle flights 62, 62' that are mechanically attached to a first drive source, and the sleeve can carry helical flights 102, 112 that are mechanically attached to a second drive source.

Similar to the integral formation or separate formation of the portions of the rotatable shaft, the housing of each portion of the reactor may be formed integrally or separately and then joined to yield coextensive portions 30, 32, 34. In still other embodiments, reactor 20 can be equipped with heating and/or cooling elements. For example, in one or more embodiments, at least one of sidewall 42 of reaction zone 30, sidewall 72 of separation zone 32, and sidewall 82 of compaction zone 34 may be equipped with a heating jacket (not shown) or a cooling coil or other elements to cool the contents of the reactor. In these or other embodiments, shaft assembly 24 can be adapted to provide heating and/or cooling to the contents of the reactor. For example, in one or more embodiments, at least one of first axial portion 60, second axial portion 100, and third axial portion 110 is adapted to carry and/or circulate heating and/or cooling materials (e.g., cooling fluid) and thereby transfer heat either into or out of the reactor through the walls of at least one of these axial portions.

In one or more embodiments, reactor 20 is a sealed unit, which refers to a vessel that can be operated under pressure or vacuum without appreciable leakage of air in or out of the system. This may be accomplished by requiring at least the shaft seals to be gas blanketed to prevent air leakage, with a preference for nitrogen blanketing. In one or more embodiments, reactor 20 is sealed to an extent where the allowable leakage rate is less than 100 grams/hour per seal, or less than 75 grams/hour per seal, or less than 50 grams/hour per seal.

As indicated above, the reactor of the present invention can advantageously process multi-phase compositions such as those multi-phase compositions that exist in polymerization processes. As the skilled person will recognize, the reactants of many polymerization processes may be insoluble or only partially soluble in the polymerization mixture, which includes the polymerization reactants, catalysts, and, optionally, diluent or solvent. Regardless of the solubility of the reactants, in certain polymerization reactions, the polymerization product is insoluble or only partially soluble in the polymerization mixture, which includes the products of polymerization, unreacted reactants, catalyst residues, and, optionally, diluent and/or solvent. The skilled person also recognizes that these polymerization mixtures can be viscous, sticky, and extremely difficult to process, especially at high solids contents. The apparatus of the present invention advantageously allows for reaction conditions within reaction zone 30 at relatively high solids contents, such as solids contents of at least 20%, in other embodiments at least 35%, in other embodiments at least 50%, and in other embodiments at least 65% solids.

Following mixing and kneading within reaction zone 30, separation zone 32 provides for at least partial separation of the phase-separated constituents of the polymerization mixture; i.e., the solid polymerization product or viscous liquid polymerization product, can be separated from the diluent in which it is insoluble or only partially soluble. Following this solid-liquid or liquid-liquid phase separation within separation zone 32, the polymerization product can be further deliquified within compaction zone 34.

Figure 4:
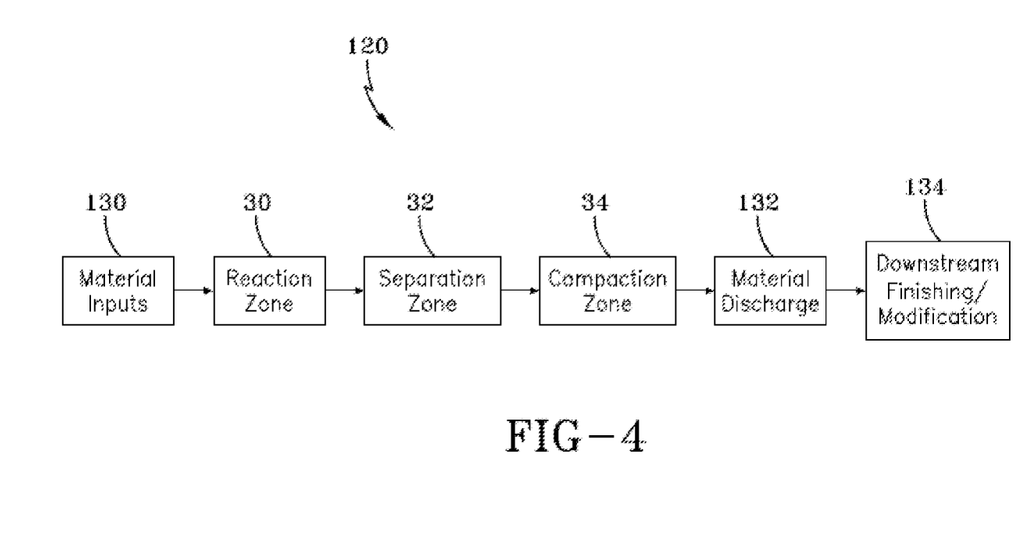
FIG. 4 is a flow diagram of a polymerization process employing an apparatus according to embodiments of the present invention.

Accordingly, embodiments of the present invention include a polymerization process that can be described with reference to FIG. 4. Polymerization process 120 includes a first step where reactants (e.g., monomer), catalysts, and, optionally, solvents or diluents are charged in a materials input step 130. These various materials can be charged to the reactor using conventional feed equipment. Once inside the reactor, the reactants are mixed and/or kneaded or granulated while undergoing reaction (e.g., polymerization) within reaction zone 30, and ultimately conveyed to separation zone 32 where the solids and/or viscous liquid component of the polymerization mixture is at least partially separated from the diluent and the diluent is allowed to flow back to reaction zone 30. The polymerization product is then conveyed to compaction zone 34 where squeezing forces reduce and eliminate polymerization product voids and free space within this zone and further drive out diluents from the polymerization product. Conveying forces and material flow forces discharge of the product from the reactor, optionally, assisted by material discharge apparatus 132, such as a downstream extruder. In one or more embodiments, downstream additives, such as quenching agents, can be charged within material discharge apparatus 132. Also, material discharge apparatus 132 can be equipped with and regulated by a downstream apparatus, such as a gear pump, variable die, and/or isolation device. As shown in FIG. 1, a twin screw extruder 132 can be positioned downstream of reactor 20. Material discharge apparatus 132 can deliver the polymerization product to downstream finishing and/or modification steps 134.

Specific Embodiments

Paragraph A: A reactor comprising a first portion having a generally cylindrical housing, an inlet at one end of said first portion housing, the opposed end of said first portion housing being the outlet of said first portion, where said first portion includes a rotatable shaft positioned axially within said housing and including at least two shearing paddles extending radially from said rotatable shaft and a second portion having a generally frustoconical housing having a first end larger than a second end, said first end constituting an inlet to said second portion and coextensive with said opposed end of said first portion housing, and an outlet at said second end, where said second portion includes a rotatable shaft positioned axially within said housing and including at least one generally helical flight extending radially from said rotatable shaft.

Paragraph B: The reactor of any one of or any combination of Paragraph A, where said rotatable shaft of said first portion and said rotatable shaft of said second portion are integral with each other.

Paragraph C: The reactor of any one of or any combination of Paragraphs A-B, further comprising a third portion having a generally cylindrical housing, an inlet at one end of said third portion and coextensive with said outlet at said second end of said second portion, and an outlet proximate to an opposed end of said third portion, where said third portion includes a rotatable shaft positioned axially within said housing and including at least one generally helical flight extending radially from said rotatable shaft.

Paragraph D: A reactor comprising a first portion including a generally cylindrical housing and a rotatable shaft positioned axially within said housing and including at least two flights of at least one shearing paddle extending radially from said rotatable shaft, said housing including at least two kneading hooks fixed to said housing and extending inwardly toward said rotatable shaft, said first portion having a length defined by a first terminus, which is proximate to an inlet, and an outlet terminus, said housing of said first portion having an inner wall, where an open space exists between said inner wall, said shaft, said at least two flights, and said kneading hooks and a second portion including a housing and a rotatable shaft positioned axially within said housing and including at least one generally helical flight extending radially from said rotatable shaft, said housing of said second portion having an inner wall and an open space between said inner wall and said rotatable shaft and said at least one generally helical flight, said open space defined by a cross-sectional area taken in the plane transverse to axis of said portion, said second portion having a length defined by an inlet terminus and an outlet terminus, where the cross-sectional area of said open space decreases from said inlet terminus to said outlet terminus; where the open space at the inlet terminus of said second portion is coextensive with said open space at the outlet terminus of said first portion.

Paragraph E: The reactor of any one of or any combination of A-D, further comprising a third portion including a housing and a rotatable shaft positioned axially within said housing and including at least one generally helical flight extending radially from said rotatable shaft, said housing of said third portion having an inner wall and an open space between said inner wall and said rotatable shaft and said at least one generally helical flight, said open space defined by a cross-sectional area taken in the plane transverse to axis of said portion, said third portion having a length defined by an inlet terminus and an outlet terminus, where the open space at the inlet terminus of said third portion is coextensive with said open space at the outlet terminus of said second portion.

Paragraph F: The reactor of any one of or any combination of Paragraphs A-E, where said rotatable shaft within said first portion includes at least two flights of shearing paddles extending radially from said rotatable shaft.

Paragraph G: The reactor of any one of or any combination of Paragraphs A-F, where said helical flight extending radially from said rotatable shaft within said second portion includes a tip, and where a gap exists between said tip and said inner wall of said second portion.

Paragraph H: The reactor of any one of or any combination of A-G, where said helical flight within said second portion is adapted to permit flow of liquids or less viscous materials toward said inlet terminus of said second portion.

Paragraph I: The reactor of any one of or any combination of A-H, where said helical flight extending radially from said rotatable shaft within said third portion includes flights having an average spacing that is smaller than the average spacing of the flights of said helical flight of said second portion.

Paragraph J: The reaction of any one of or any combination of A-I, where at least one flight of paddles in the first portion extends at an angle relative to the longitudinal length of said rotatable shaft forming a helical pattern about said rotatable shaft.

Paragraph J: A reactor comprising a first portion adapted to mix and knead the contents of the reactor, a second portion adapted to separate the physically-distinct constituents therein, and a third portion adapted to compact or squeeze the contents therein.

Paragraph K: A polymerization process comprising the steps of charging monomer and diluent to reactor having three distinct zones that are coextensive at their interfaces, polymerizing the monomer to form polymer product with a first zone of the reactor while subjecting the monomer, polymer product, and diluent to kneading, separating the polymer product from at least a portion of the diluent within a second zone of the reactor, compacting the polymer product with a third zone of the reactor, and discharging the polymer product from the reactor.

Various modifications and alterations that do not depart from the scope and spirit of this invention will become apparent to those skilled in the art. This invention is not to be duly limited to the illustrative embodiments set forth herein.

What is claimed is:
1. A polymerization reactor comprising:
(i) a source of one or more monomer reactants and a diluent;
(ii) a first portion having a generally cylindrical housing, an inlet for the one or more monomer reactants and the diluent at one end of said first portion housing, a first outlet proximate to the opposed end of said first portion housing, and a second outlet adapted to allow removal of a vapor stream from the polymerization reactor through the side wall or end wall of said first portion housing, where said first portion includes a rotatable shaft positioned axially within said housing of said first portion and including at least two shearing paddles extending radially from said rotatable shaft within said first portion, and wherein the first portion is adapted to mix and knead a reaction mixture comprising the one or more monomer reactants, a polymer product, and the diluent; and (iii) a second portion having a generally frustoconical housing having a first end larger than a second end, said first end constituting an inlet to said second portion and coextensive with said opposed end of said first portion housing, and an outlet at said second end, where said second portion includes a rotatable shaft positioned axially within said housing of said second portion and including at least one generally helical flight extending radially from said rotatable shaft within said second portion, where said at least one generally helical flight is adapted to permit flow of liquids or less viscous materials toward said inlet to said second portion, and wherein the second portion is adapted to separate the polymer product from at least a portion of the diluent.

2. The polymerization reactor of claim 1, where said rotatable shaft of said first portion and said rotatable shaft of said second portion are integral with each other.

3. The polymerization reactor of claim 1, further comprising a third portion having a generally cylindrical housing, an inlet at one end of said third portion and coextensive with said outlet at said second end of said second portion, and an outlet proximate to an opposed end of said third portion, where said third portion includes a rotatable shaft positioned axially within said housing and including at least one generally helical flight extending radially from said rotatable shaft.

4. A polymerization reactor comprising:
(i) a source of one or more monomer reactants and a diluent;
(ii) a first portion including a generally cylindrical housing and a rotatable shaft positioned axially within said housing and including at least two flights of at least one shearing paddle extending radially from said rotatable shaft within said first portion, said housing of said first portion including at least two kneading hooks fixed to said housing of said first portion and extending inwardly toward said rotatable shaft within said first portion, said first portion having a length defined by a first terminus, which is proximate to an inlet for the one or more monomer reactants and the diluent, and an outlet terminus, said housing of said first portion having a second outlet adapted to allow removal of a vapor stream from the polymerization reactor through the side wall or end wall of said first portion housing, and said housing of said first portion having an inner wall, where an open space exists between said inner wall, said shaft, said at least two flights, and said kneading hooks, wherein the first portion is adapted to mix and knead a reaction mixture comprising the one or more monomer reactants, a polymer product, and the diluent; and
(iii) a second portion including a housing and a rotatable shaft positioned axially within said housing of said second portion and including at least one generally helical flight extending radially from said rotatable shaft, said housing of said second portion having an inner wall and an open space between said inner wall and said rotatable shaft within said second portion and said at least one generally helical flight, said open space defined by a cross-sectional area taken in the plane transverse to axis of said portion, said second portion having a length defined by an inlet terminus and an outlet terminus, where the cross-sectional area of said open space decreases from said inlet terminus to said outlet terminus; where the open space at the inlet terminus of said second portion is coextensive with said open space at the outlet terminus of said first portion, where said at least one generally helical flight is adapted to permit flow of liquids or less viscous materials toward said inlet terminus of said second portion, and wherein the second portion is adapted to separate the polymer product from at least a portion of the diluent.

5. The polymerization reactor of claim 4, further comprising a third portion including a housing and a rotatable shaft positioned axially within said housing and including at least one generally helical flight extending radially from said rotatable shaft within said third portion, said housing of said third portion having an inner wall and an open space between said inner wall and said rotatable shaft and said at least one generally helical flight, said open space defined by a cross-sectional area taken in the plane transverse to axis of said portion, said third portion having a length defined by an inlet terminus and an outlet terminus, where the open space at the inlet terminus of said third portion is coextensive with said open space at the outlet terminus of said second portion.

6. The polymerization reactor of claim 1, where said rotatable shaft within said first portion includes at least two flights of shearing paddles extending radially from said rotatable shaft.

7. The polymerization reactor of claim 1, where said helical flight extending radially from said rotatable shaft within said second portion includes a tip, and where a gap exists between said tip and said inner wall of said second portion.

8. The polymerization reactor of claim 3, where said helical flight extending radially from said rotatable shaft within said third portion has a channel with an average cross-sectional area that is smaller than the average cross-sectional area of the channel within said at least one generally helical flight of said second portion.

9. The polymerization reactor of claim 1, wherein at least one flight of paddles in the first portion extends at an angle relative to the longitudinal length of said rotatable shaft forming a helical pattern about said rotatable shaft.

* * * * *